United States Patent [19]
Jenq

[11] Patent Number: 5,886,887
[45] Date of Patent: Mar. 23, 1999

[54] VOLTAGE MULTIPLIER WITH LOW THRESHOLD VOLTAGE SENSITIVITY

[75] Inventor: Ching-Shi Jenq, Los Altos, Calif.

[73] Assignee: Integrated Memory Technologies, Inc., Santa Clara, Calif.

[21] Appl. No.: 49,283

[22] Filed: Mar. 26, 1998

Related U.S. Application Data

[60] Provisional application No. 60/041,624 Mar. 27, 1997.

[51] Int. Cl.[6] .................................................. H02M 3/18
[52] U.S. Cl. ........................... 363/60; 307/110; 327/537
[58] Field of Search ........................ 363/59, 60; 307/109, 307/110; 327/530, 536, 537

[56] References Cited

U.S. PATENT DOCUMENTS

| | | | |
|---|---|---|---|
| 4,656,574 | 4/1987 | Salchli | ................................ 363/60 |
| 5,196,996 | 3/1993 | Oh . | |
| 5,301,097 | 4/1994 | McDaniel . | |
| 5,398,001 | 3/1995 | Karl | ................................ 327/258 |
| 5,414,614 | 5/1995 | Fette et al. | ............................ 363/59 |
| 5,422,586 | 6/1995 | Tedrow et al. . | |
| 5,578,954 | 11/1996 | Rapp | ................................ 327/258 |
| 5,600,551 | 2/1997 | Luscher, Jr. | ............................ 363/59 |
| 5,646,562 | 7/1997 | Abe | ................................ 327/156 |
| 5,694,308 | 12/1997 | Cave | ................................ 363/59 |
| 5,754,417 | 5/1998 | Nicollini | ................................ 363/60 |
| 5,790,393 | 8/1998 | Fotouhi | ................................ 363/60 |

OTHER PUBLICATIONS

"On–Chip High–Voltage Generation in MNOS Integrated Circuits Using an Improved Voltage Multiplier Technique " by John F. Dickson, *IEEE Journal of Solid–State Circuits*, vol. SC–11, No. 3, Jun. 1974.

A 5–V–Only Operation 0.6–um Flash EEPROM with Row Decoder Scheme in "Triple–Well Structure" By Umezawa et. al, *IEEE Journal of Solid–State Circuits*, vol. 27, No. 11, Nov., 1992.

*Primary Examiner*—Adolf Deneke Berhane
*Attorney, Agent, or Firm*—Ronald L. Yin; Limbach & Limbach LLP

[57] ABSTRACT

A voltage multiplier has a number of electrically-like stages. Each of the stages receives two input signals and a pump signal. The stage has an MOS transistor with a first source/drain region and a second source/drain region and a gate. Each stage also has means for receiving a pump signal and for separately pumping the first source/drain region and the gate of the first transistor by the pump signal. The two input signals are supplied to the first source/drain region and the gate of the first transistor, respectively. A first output signal is supplied from the second source/drain region of the first transistor, and from the first source/drain region of the first transistor. A voltage signal is supplied as the input signal of the first stage and a clock signal having a first phase is supplied to the first stage as the pump signal of the first stage. The first and second output signals of the first stage are supplied to the second stage as the input signals of the second stage and a clock signal having a second phase different from the first phase is supplied to the second stage as the pump signal of the second stage.

15 Claims, 9 Drawing Sheets

VOLTAGE MULTIPLIER WITH LOW THRESHOLD VOLTAGE SENSITIVITY

This application claims the benefits of U.S. Provision Application No. 60/041,624, filed Mar. 27, 1997, and entitled VOLTAGE MULTIPLIER WITH LOW THRESHOLD VOLTAGE SENSITIVITY.

TECHNICAL FIELD

The present invention relates to a voltage multiplier which can operate effectively at low power supply voltages, such as 3 volts or below. More particularly, the present invention relates to a voltage multiplier which does not depend upon the use of MOS transistors that have low initial threshold voltages.

BACKGROUND OF THE INVENTION

Voltage multipliers to "pump" a voltage from a low source to a high source are well known in the art. Typically, they are used in non-volatile memory arrays in which the high voltage is required to program or erase the non-volatile memory cells. The supplied voltage is the "low" voltage and the "high" voltage is used to program or erase the memory cells. As supplied voltages have decreased due to integrated circuits being used in applications using only battery supplies, the low voltage has decreased. In the prior art, in order to effectively "pump" the low voltage to the high voltage, the voltage multipliers have used MOS transistors that have low initial threshold voltage and body effect so that the voltage drop across the MOS diode is minimized. Some prior art designs have used multiple-phase clock signals to boost the gate voltage of the MOS diode to compensate for the threshold drop and to improve the pumping efficiency.

Figure 1:
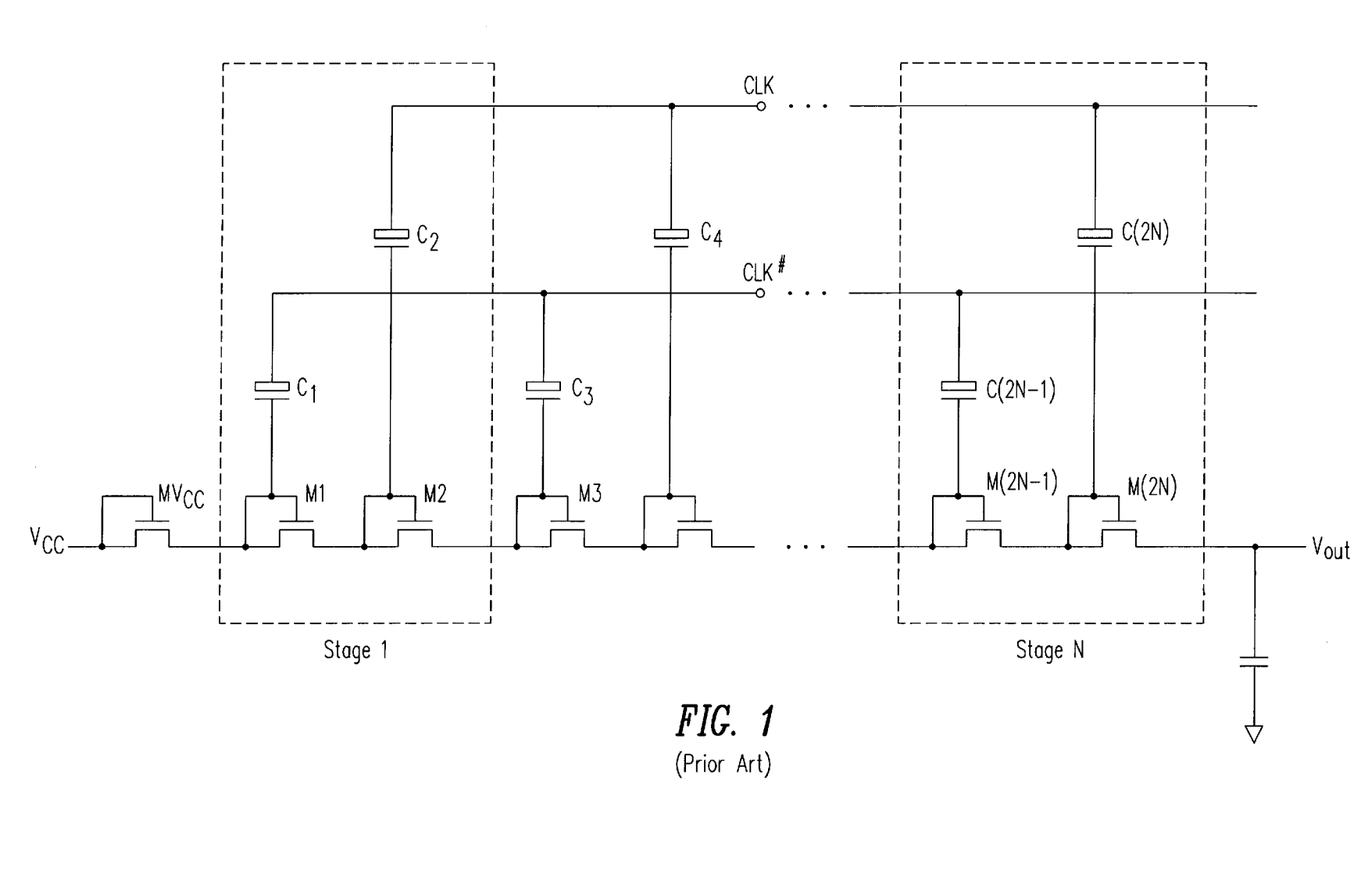
FIG. 1 is a schematic circuit diagram of a voltage multiplier of the prior art.

FIG. 1 shows the design of a prior art single phase clock voltage multiplier circuit. Each pump stage is comprised of two MOS transistors, e.g. M1 and M2 for the first stage. Each transistor is connected in a diode configuration. Capacitors C1 and C2 supply the clock signals, $\overline{CLK}$ and CLK respectively, to M1 and M2, respectively. In such design the output voltage $V_{out}$ is determined by the following equation, assuming no current load is required from the output node:

$$V_{out}=(V_{CC}-V_{th})+N(V_{CLK}C/(C+C_s)-V_{th}) \quad (1)$$

where ($V_{CC}-V_{th}$) is the voltage at the input to the first stage of the voltage multiplier after the voltage has passed through the transistor MVcc;

$V_{th}$ is the threshold voltage of each transistor $M_{(2n-1)}$ and $M_{(2n)}$ in the multiplier;

C is the capacitance of the coupling capacitor $C_{(2n-1)}$, and $C_{(2n)}$ in the nth stage of the multiplier, with $C_{(2n-1)}=C_{(2n)}$;

$C_s$ is the parasitic capacitance at the drain node of each transistor $M_{(2n-1)}$ and $M_{(2n)}$ in the multiplier;

f is the frequency of the clock signal;

$V_{CLK}$ is the voltage of the clock signal; and

N is the total number of stages of the multiplier.

Typically, C/(C+$C_s$) is ~85% and $V_{th}$ can be from approximately 1 Volt to 2.5 Volt or higher depending on the degree of the body effect of the transistor which varies from process to process. $V_{CLK}$ typically is the same as $V_{CC}$. When $V_{CC}$ is less than 3 V, the term $V_{CLK}$ C/(C+$C_s$) is very close to the $V_{th}$. This will severely degrade the pumping efficiency of the multiplier.

Thus, the prior art tried to eliminate $V_{th}$ or its effect to obtain a larger gain, e.g. to get higher $V_{CLK}$ on the gate of the transistors M, or to use multi-phase clock signals. See for example, U.S. Pat. No. 5,301,097; 5,422,586; 5,196,996; "On-Chip High-Voltage Generation in MNOS Integrated Circuits Using an Improved Voltage Multiplier Technique" by John F. Dickson, *IEEE Journal of Solid-State Circuits*, Vol SC-11, No. 3, June 1974; and A 5-V-Only Operation 0.6-um Flash EEPROM with Row Decoder Scheme in Triple-Well Structure" by Umezawa et. al, *IEEE Journal of Solid-State Circuits*, Vol. 27, No. 11, November, 1992.

SUMMARY OF THE INVENTION

In the present invention a voltage multiplier comprises a plurality of electrically connected-like stages which include at least a first stage and a second stage. Each of the first and second stages receives a first and a second input signals and a pump signal. Each of the first and second stages comprises a first transistor having a first terminal, a third terminal, a channel therebetween and a second terminal for controlling the flow of current between the first terminal and the third terminal. Each of the first and second stages provides a means for receiving the pump signal and for separately pumping the first terminal and the second terminal of the first transistor by the pump signal. The first input signal is supplied to the first terminal of the first transistor. The second input signal is supplied to the second terminal of the first transistor. A first output signal is supplied from the third terminal of the first transistor. A second output signal is supplied from the first terminal of the first transistor. A voltage signal is supplied to the first stage as the first and second input signals of the first stage and a clock signal having a first phase is supplied to the first stage as the pump signal of the first stage. The first and second output signals of the first stage are supplied to the second stage as the first and second input signals of the second stage. A clock signal having a second phase, different from the first phase, is supplied to the second stage as the pump signal of the second stage.

DETAILED DESCRIPTION OF THE DRAWINGS

Figures 2, 2A:
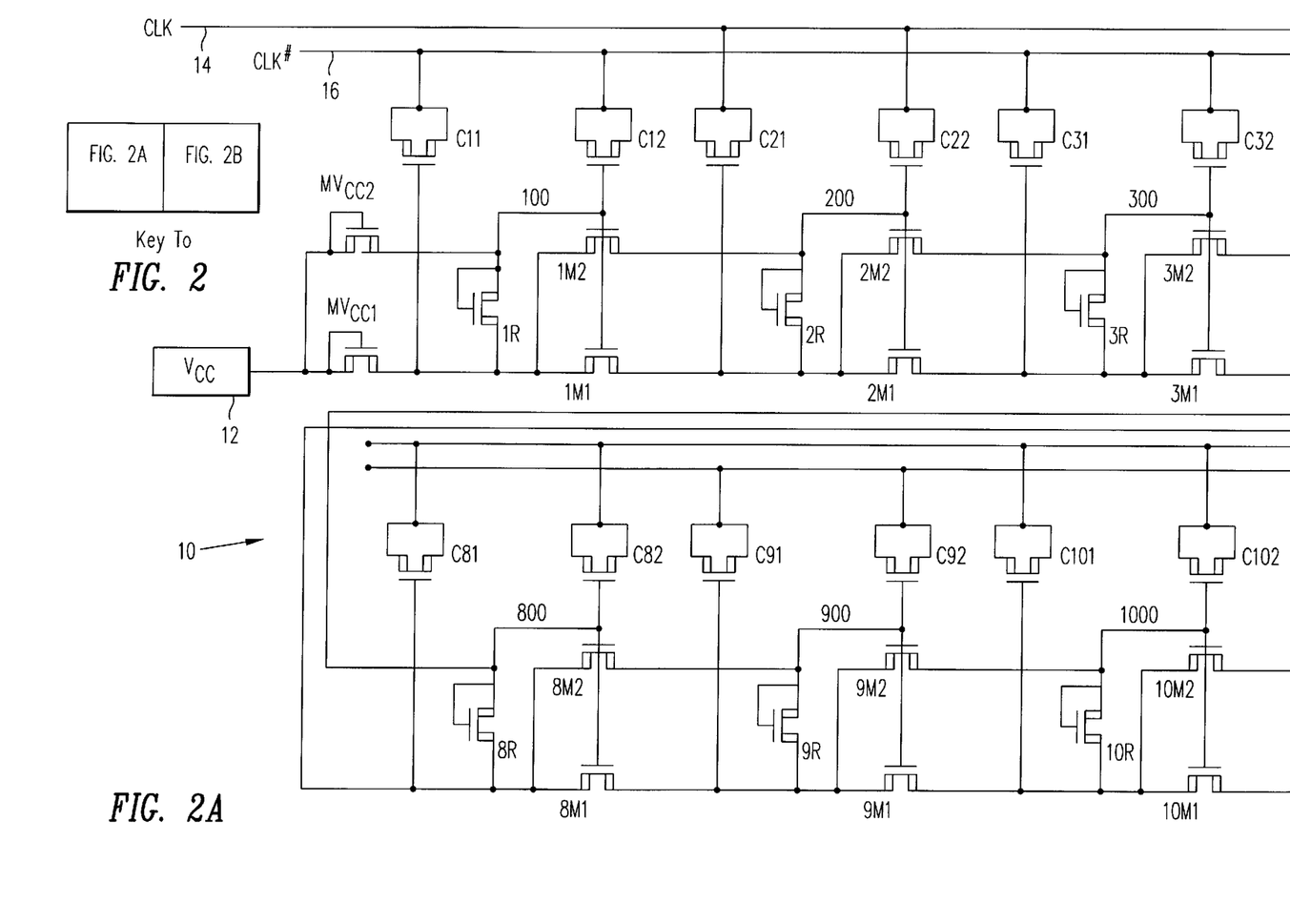
FIG. 2 is a schematic circuit diagram of the voltage multiplier of the present invention showing fourteen (14) stages.
Figure 2B:
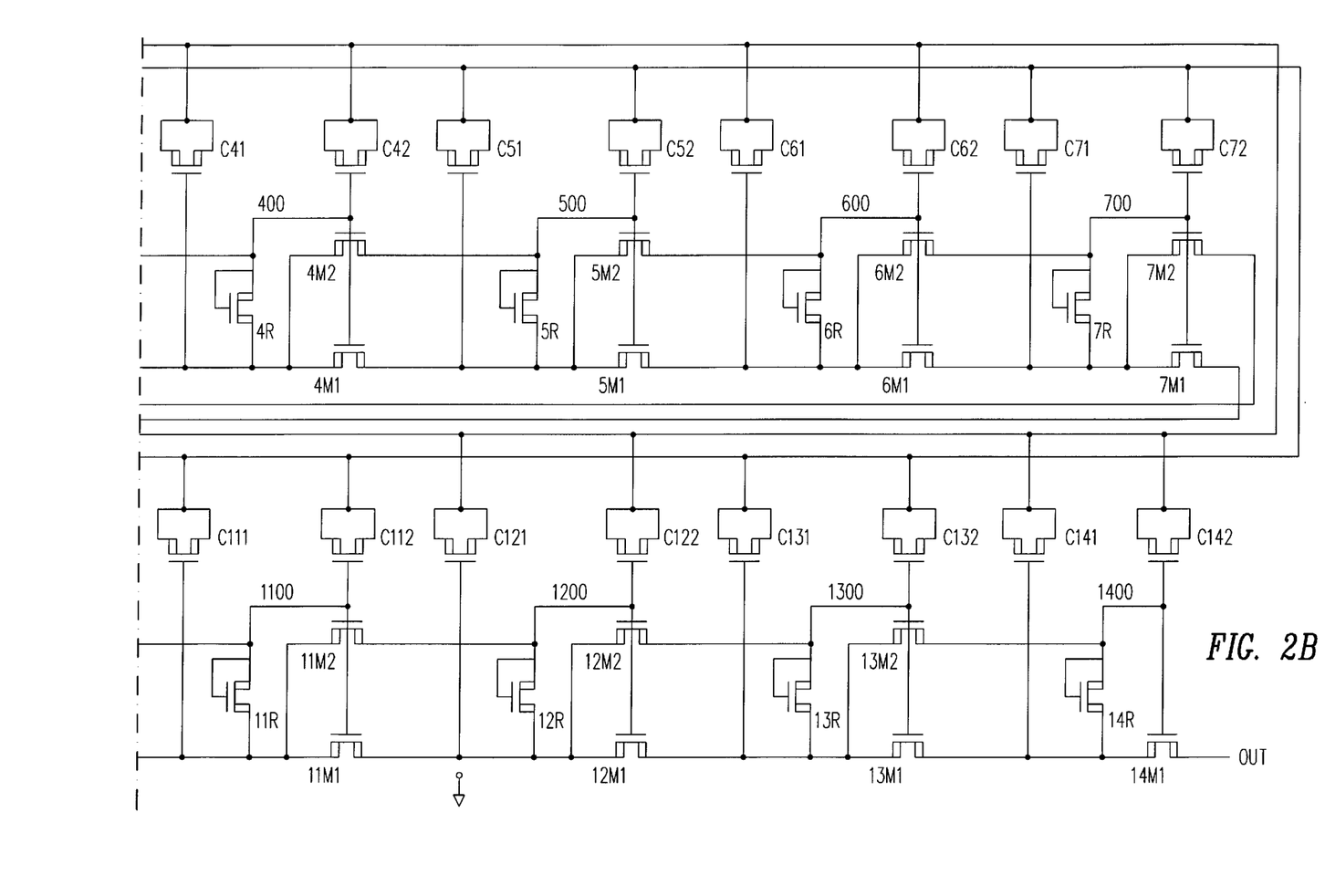

Referring to FIG. 2 there is shown a schematic circuit diagram of a voltage multiplier 10 of the present invention. The voltage multiplier 10 comprises 14-like stages. With the exception of the first stage and the last stage, each of the stages receives two input signals and produces two output signals which are supplied as input signals to the adjacent electrically connected stage. The first stage 100 receives one input signal 12 from a voltage source $V_{CC}$, and generates two output signals which are supplied as the input signals to the second stage 200. The second stage 200 receives the two input signals and generates two output signals which are supplied as the input signals to the third stage 300, and so on. The last stage 1400 receives two input signals and generates one output signal.

The voltage multiplier 10 also receives a clock signal CLK 14 and its inverse $\overline{\text{CLK}}$ 16. The clock signal 14 and the clock signal 16 are shifted by 180° from one another and therefore can be from the same clock signal. The clock signal 14 is supplied to alternating stages, i.e. second stage 200, fourth stage 400, sixth stage 600, etc. as a pump signal thereto. The clock signal $\overline{\text{CLK}}$ 16 is supplied as a pump signal to the other alternating stages, namely first stage 100, third stage 300, fifth stage 500, etc., as a pump signal to those stages. The output of the voltage multiplier 10 is the output of the last stage or the fourteenth stage 1400.

Figure 3:
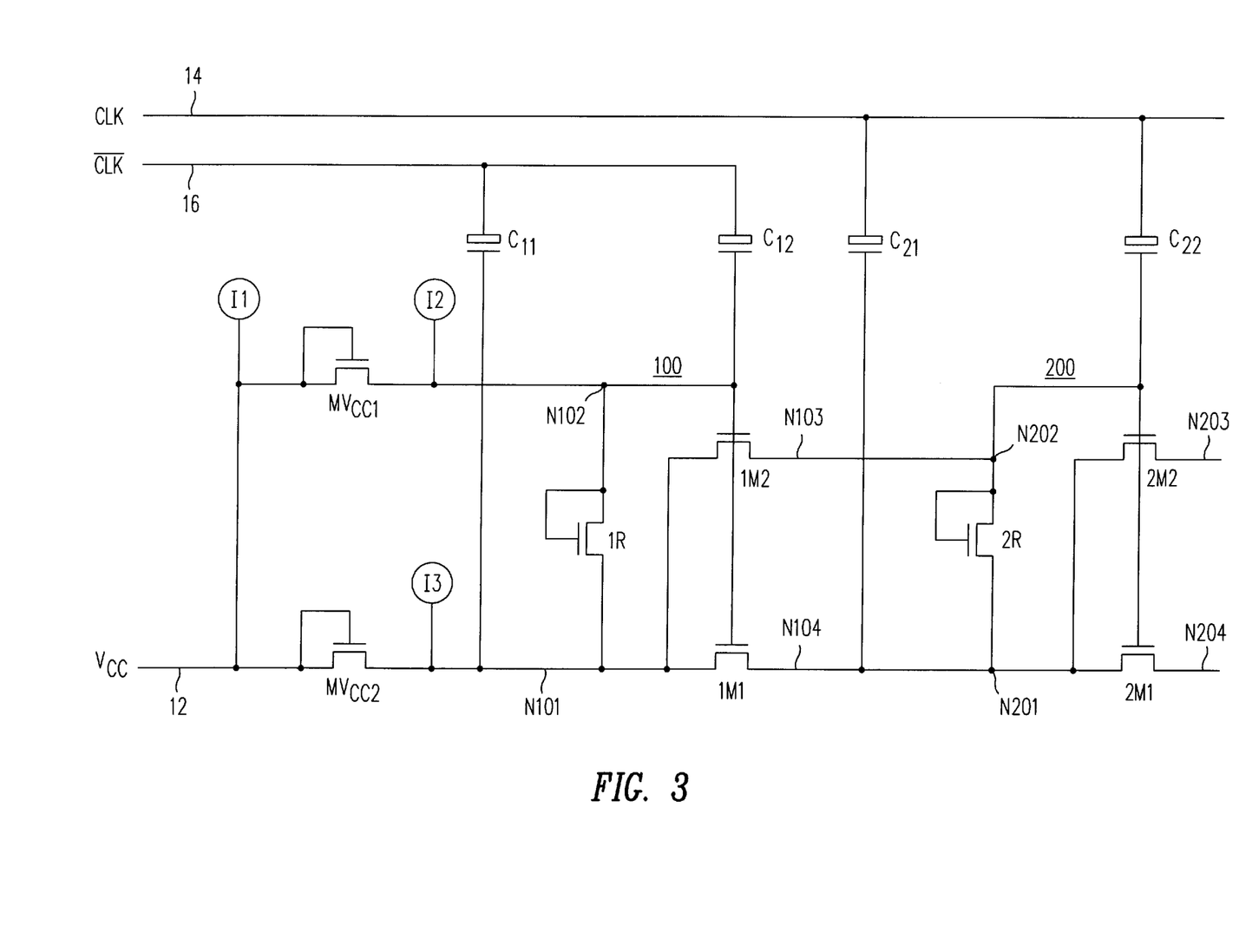
FIG. 3 is a schematic circuit diagram of a portion of the voltage multiplier, shown in FIG. 2 with only two stages.

Referring to FIG. 3 there is shown in greater detail a portion of the voltage multiplier 10, and in particular the first stage 100, and the second stage 200. The input signal $V_{CC}$ 12 is supplied at the node I1. At the node I1, a transistor MVCC2 has one of its source/drain regions connected to node I1 and its gate terminal also connected to node I1. The other source/drain region of transistor MVCC2 is connected to node I3, providing a first input signal to the first stage 100. Another MOS transistor MVCC1 having the same $V_{th}$ as the MOS transistor MVCC2 has its one source/drain region connected to node I1. The gate of transistor MVCC1 is also connected to node I1. The other source/drain region of transistor MVCC1 is connected to node I2, providing a second input signal to the first stage 100. Nodes I2 and I3 supply the input signals to the first stage 100.

The first stage 100 receives the first input signal from node I3 at node N101 of first stage 100. A MOS transistor 1M1 has a source/drain region connected to node N101. The other source/drain region of transistor 1M1 is connected to node N104, and supplies the first output signal of the first stage 100. The second input signal supplied along node I2 is received by first stage 100 at node N102. A second MOS transistor 1R has a source/drain region connected to node N102. The other source/drain region of MOS transistor 1R is connected node N101. The gate of transistor 1R is connected to node N102. Finally, a third MOS transistor 1M2 has a source/drain region connected to node N101. Another source/drain region of transistor 1M2 is connected to node N103 and forms a second output of the first stage 100, and supplies the second output signal. The gate of transistor 1M2 is connected to the gate of transistor 1M1 and is also connected to node N102.

As previously discussed, the first stage 100 receives the clock signal $\overline{\text{CLK}}$ 16, as a pump signal. The pump signal 16 is supplied to a first capacitor C11. The capacitor C11 has a first terminal connected to receive the pump signal 16. The capacitor C11 has a second terminal which is connected to node N101. A second capacitor C12 has a first terminal connected to receive the pump signal 16. The second capacitor C12 has a second terminal connected to node N102, which of course is also connected to the gate of transistor 1M2 and 1M1.

The second stage 200 has transistors and capacitors identical to the transistors described hereinabove for the first stage 100. The only difference is that first output signal supplied along node N104 of the first stage 100 is supplied to node N201 of the second stage 200, as the first input signal thereto. In addition, the second output signal of first stage 100 supplied along node N103 is supplied as the second input signal to the node N202 of the second stage 200. Finally, as previously discussed, the clock signal CLK 14 is supplied as the pump signal to the first and second capacitors C21 and C22, respectively. The first and second output signals of the second stage 200 are supplied along the nodes N204 and N203, respectively, and are supplied as input signals to the third stage 300. As shown in FIG. 2, the first output signal of stage 1400 supplied from the source of transistor 14M1 is the output signal of the voltage multiplier 10.

In the preferred embodiment, all of the aforementioned described MOS transistors are of N-type and have the same threshold voltage, $V_{th}$. In addition, each of the first and second capacitors of each of the stages 100 is made out of a MOS transistor which has a source, a drain, and a channel and a gate insulated from the channel with the source and drain electrically connected together to form one terminal of the capacitor. The other terminal of the capacitor is the gate region of the MOS transistor.

In operation, when the voltage multiplier 10 starts, the voltage at nodes I2 and I3 will be $V_{CC}-V_{th}$, where $V_{CC}$ is the input voltage, and $V_{th}$ is the threshold voltage of the transistors MVcc1 and MVcc2. When the voltage multiplier 10 starts, if the clock signal $\overline{\text{CLK}}$ 16 high, then the clock signal CLK 14 will be low. With $\overline{\text{CLK}}$ 16 high, capacitor C11 pumps node N101 to a voltage of $V_{CC}-V_{th}+V_d$, where $V_d$ is the pumping voltage caused by the capacitor C11. With $\overline{\text{CLK}}$ 16 high, capacitor C12 pumps node N102 to a voltage which is higher than the voltage at node N101 by the $V_{th}$ of transistor 1R. When node N102 reaches the voltage of $V_{CC}-V_{th}+V_d+V_{th}$, at that point transistor 1R would begin to conduct keeping node N102 from being pumped to a higher voltage. When node 102 is at a voltage of $V_{CC-Vth}+V_d+V_{th}$, transistors 1MI and 1M2 would conduct strongly because their gate voltages are approximately at a threshold above the drain voltage, i.e. voltage at node N101 or $V_{CC}-V_{th}+V_d$. This will cause the charges from node N101 to be supplied to nodes N201 and N202 and shared among nodes N101, N201, and N202. The voltage at nodes N201 and N202 will be at $V_{CC}-V_{th}+V_d$ due to the voltages from node N101.

At the next cycle, clock signal CLK 14 would be high, and clock signal $\overline{\text{CLK}}$ 16 would be low. When clock signal $\overline{\text{CLK}}$ 16 is low, transistors 1M1 and 1M2 would be off, thereby preventing the charges from nodes N201 and N202 from being supplied back to node N101.

At the same time, with clock signal CLK 14 high, capacitor C21 would pump up the voltage at node N201 to $V_{CC}-V_{th}+V_d+V_d$ or $(V_{CC}-V_{th})+2*V_d$. Capacitor C22 would pump up the voltage at node N202 to $(V_{CC}-V_{th})+2*V_d+V_{th}$ or $V_{CC}+2*V_d$, at which point transistor 2R would begin to conduct and limit the further increase of the voltage at node N202. Transistors 2M2 and 2M1 would conduct heavily causing the charges at node N201 to be supplied to the subsequent stage. Because the gates, i.e. node N202 of both transistor 2M2 and 2M1 are pumped to approximately one $V_{th}$ above the drain node, i.e. node N201, the $V_{th}$ drop in the second term of the right side of equation (1) is eliminated with the present invention.

With the present invention, since the threshold voltages of MVcc1 and MVcc2 are not compensated, a transistor type with lower threshold voltage, such as intrinsic transistor where no channel implant is applied, can be used to minimize the voltage drop. Furthermore, because two transistors MVcc1 and MVcc2 (connected as diodes) are used, different voltages can be supplied to the nodes I2 and I3.

Figure 4:
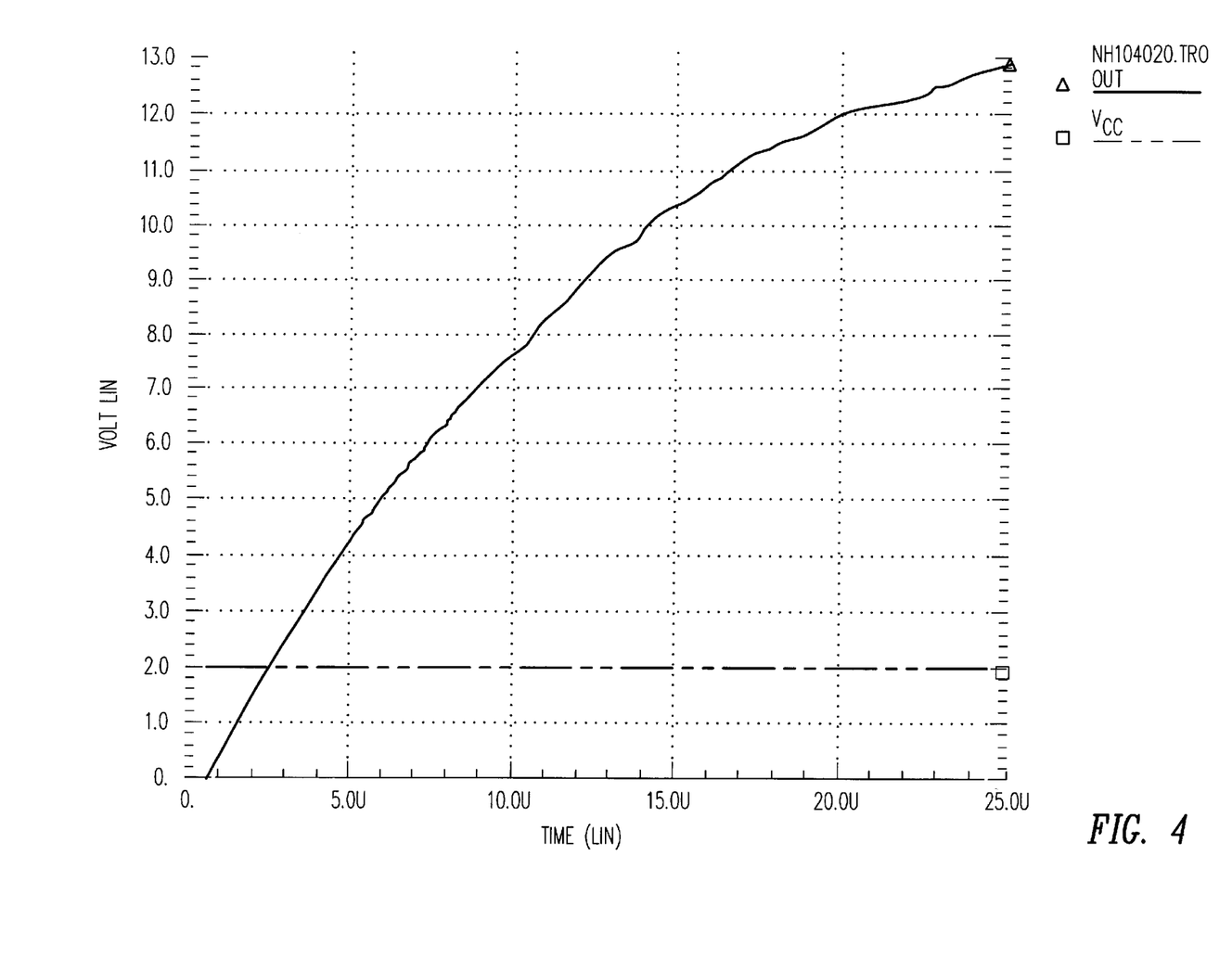
FIG. 4 is a graph illustrating the result of a simulation of a 14-stage voltage multiplier with its output voltage as a function of time and with $V_{CC}$=2 V.

In general, the current invention minimizes the effect of $V_{th}$ by biasing the gate of the MOS diode (which is shown as transistor 1M1) to around one $V_{th}$ above the drain voltage of transistor 1M1 or node N101. It is achieved by adding transistor 1M2 and 1R to 1M1 as shown in FIGS. 2 and 3. The gate and drain of 1M1 i.e. nodes N101 and N102, are pumped separately by capacitor C12 and C11, although in theory only capacitor C12 is needed to pump both the gate of the transistor 1M1 and the drain of transistor 1M1. If two separate capacitors C11 and C12 are used, the capacitor C11 functions only to supply the necessary charges across transistor 1M1. When two capacitors C11 and C12 are supplied, a smaller capacitance value is chosen for C12 which pumps the gate voltage of 1M1, i.e. node N102, while a larger capacitance value is used for C11 which pumps the drain node, i.e. node N101 of 1M1 and is responsible for supplying the current to be delivered by the multiplier. Transistor 1R is inserted to insure that the gate voltage of 1M1 is no more than one $V_{th}$ above the drain voltage of 1M1. Thus no leakage occurs in the off cycle. Therefore, transistor 1R can be replaced by a diode or any other voltage regulating means. FIG. 4 illustrates the simulation result of a 14-stage multiplier with $V_{CC}$=2 V.

Figure 5:
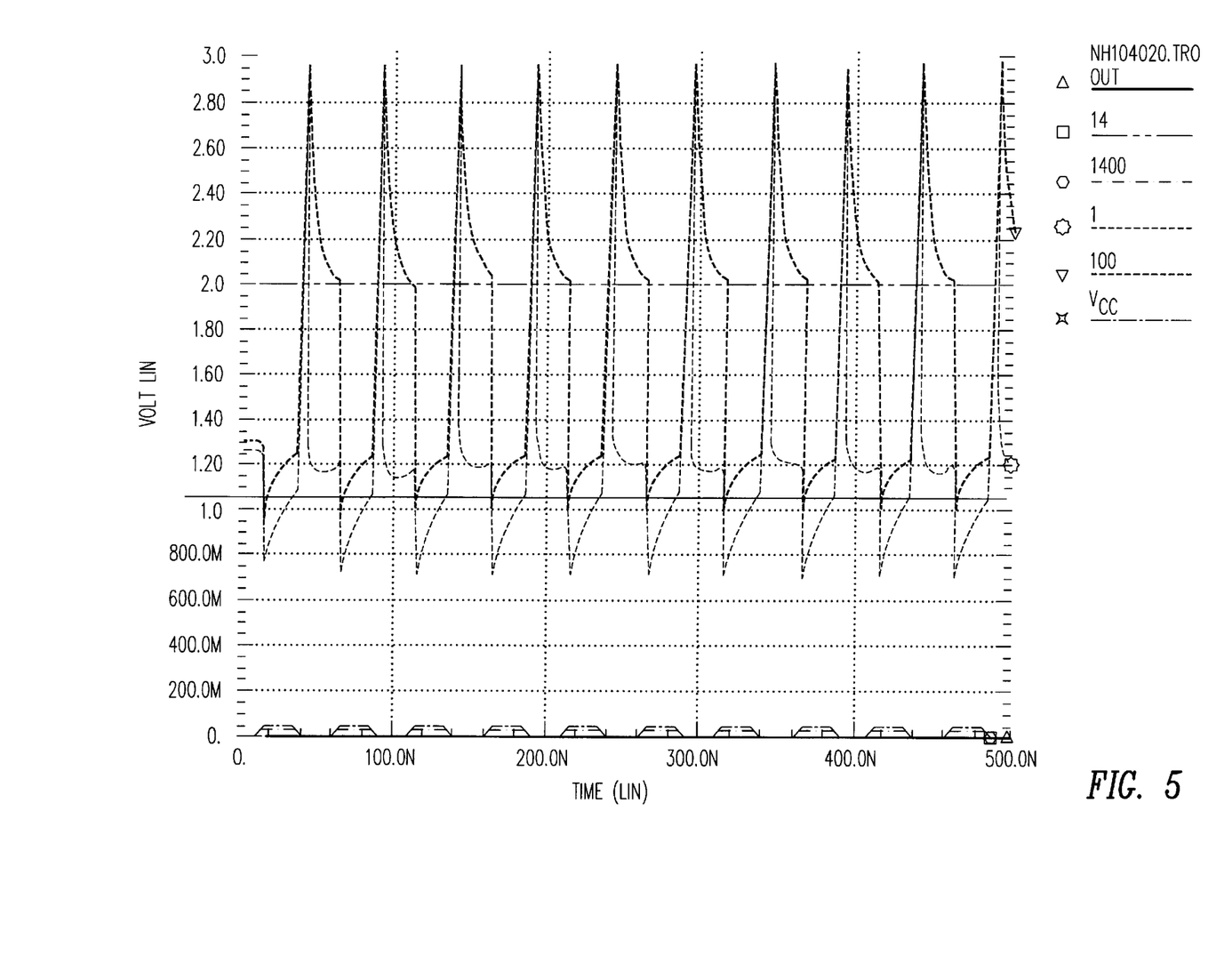
FIG. 5 is a graph of a simulation of the waveform during the first 500 nanoseconds in the voltage multiplier of the present invention of the first stage and of the fourteenth stage.
Figure 6:
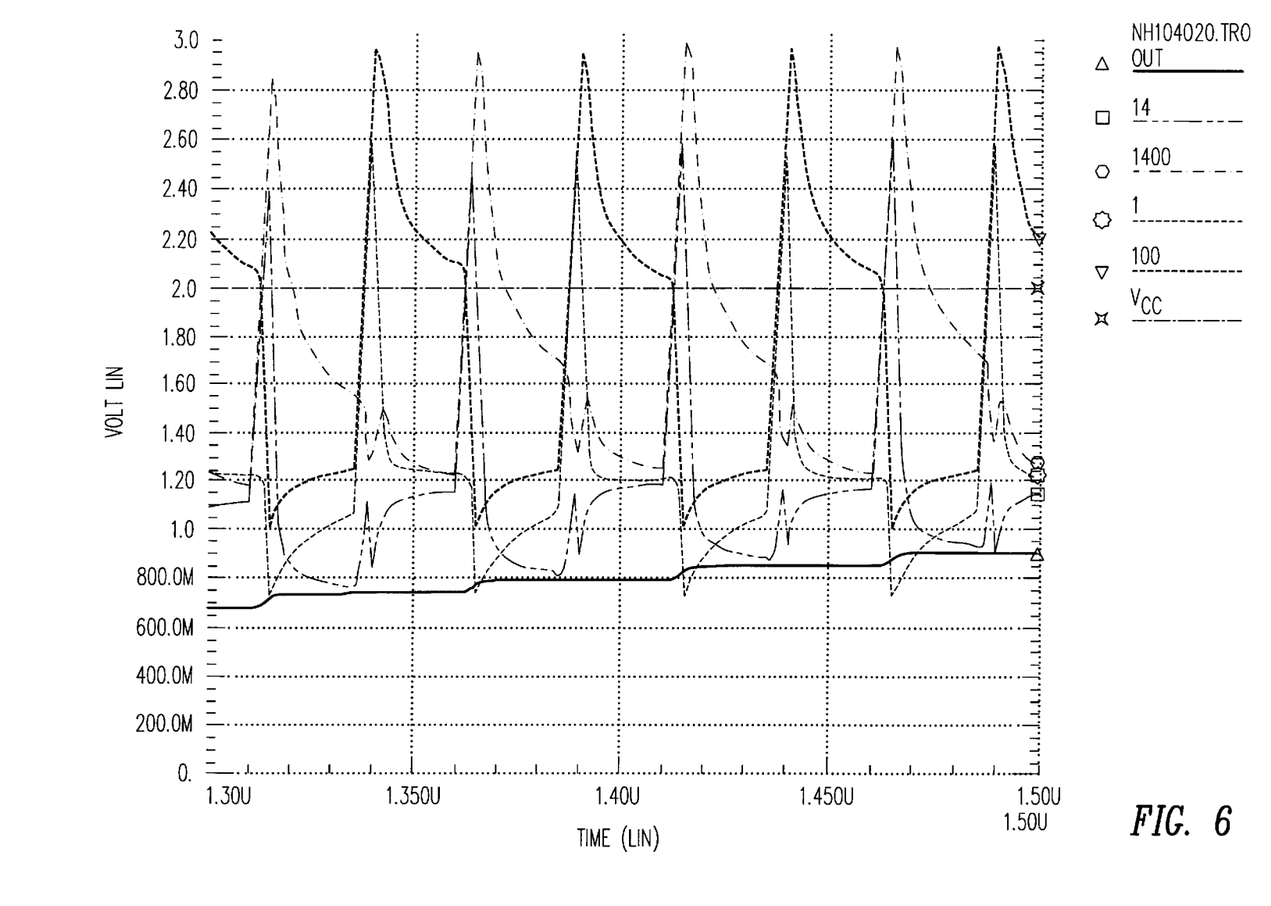
FIG. 6 is a graph of a simulation of the waveform during the time period from 1.3 to 1.5 microseconds in the voltage multiplier of the present invention of the first stage and of the fourteenth stage.
Figure 7:
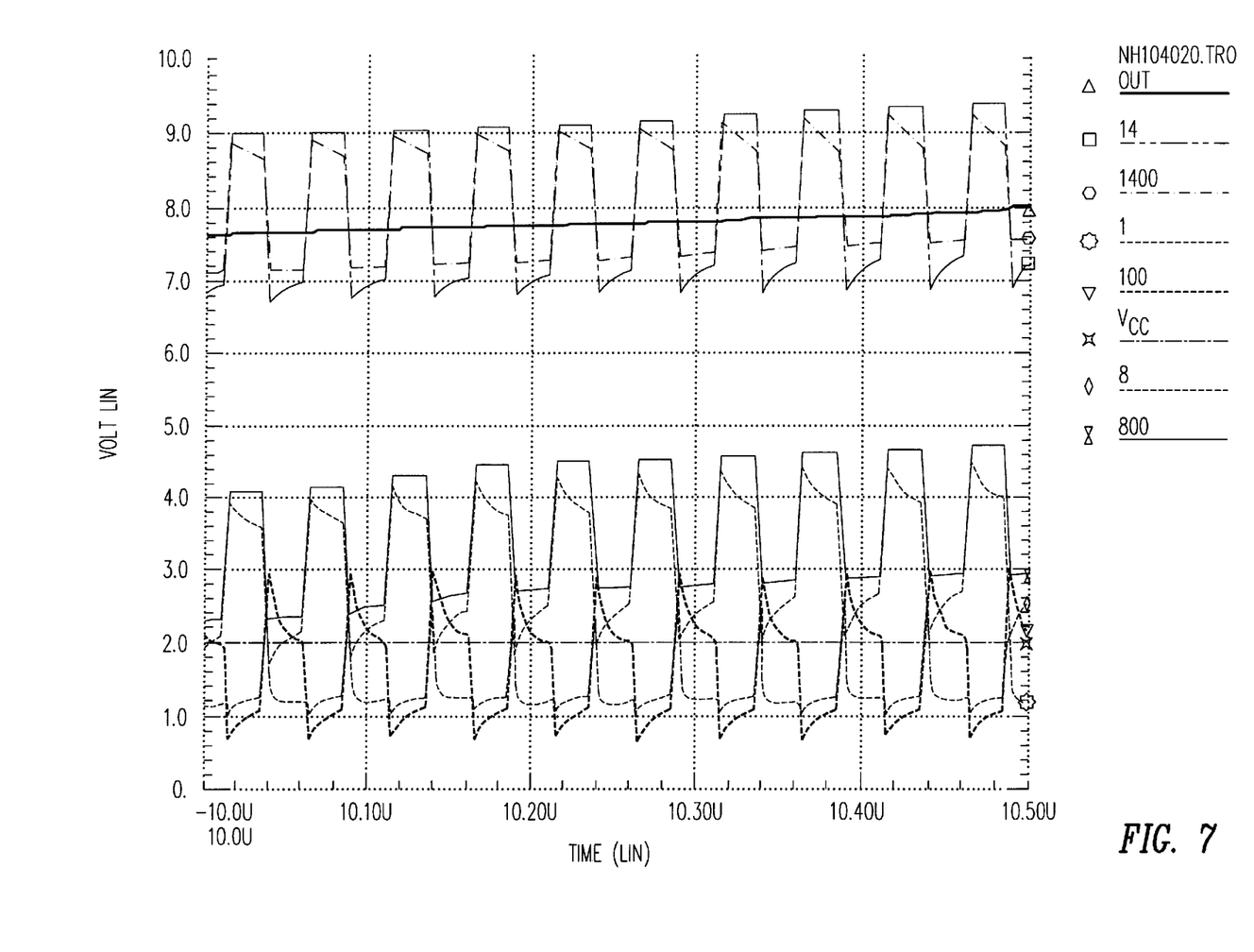
FIG. 7 is a graph of a simulation of the waveform during the time period from 10.0 to 10.5 microseconds in the voltage multiplier of the present invention of the first stage, the eighth stage, and the fourteenth stage.
Figure 8:
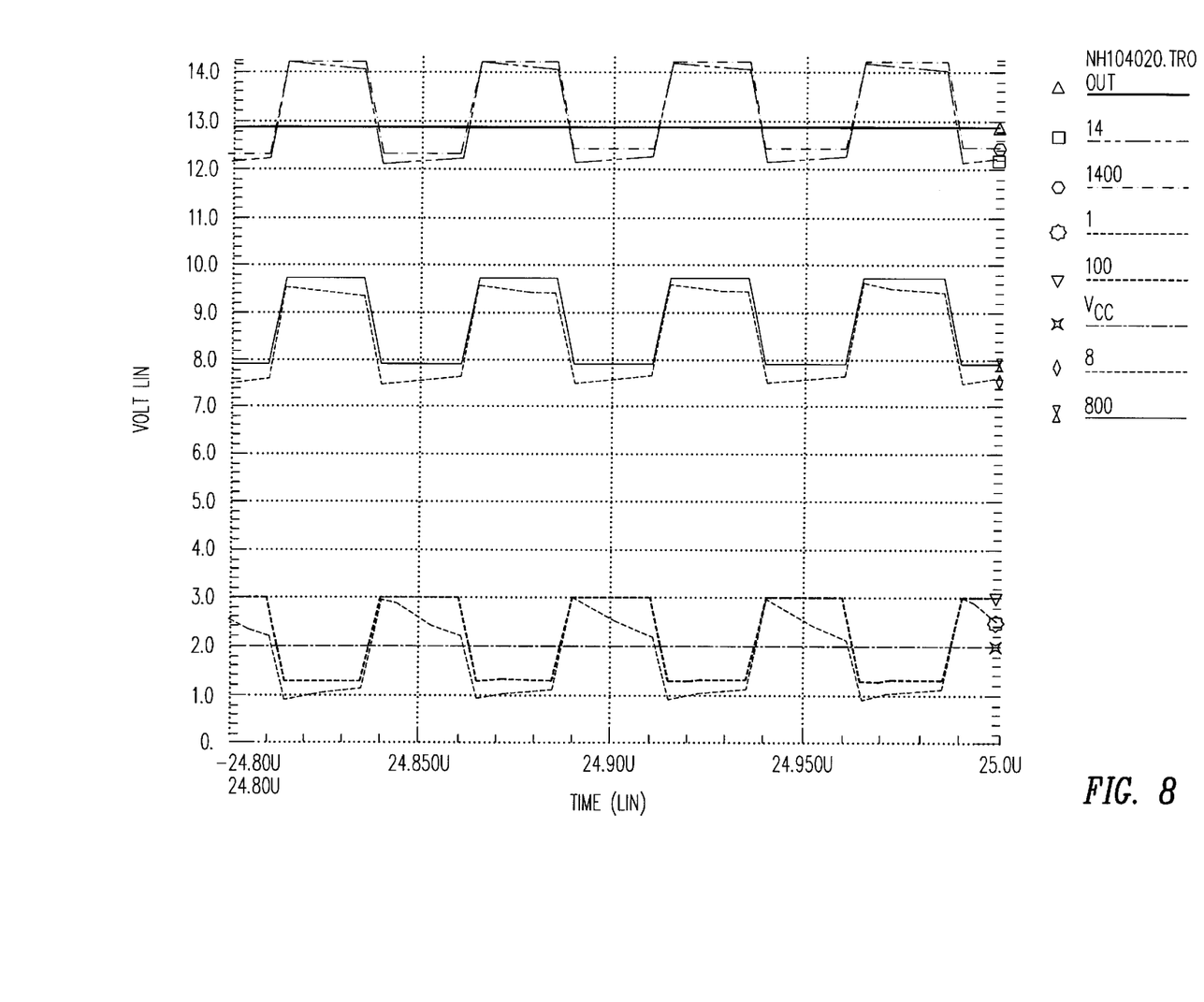
FIG. 8 is a graph of a simulation of the waveform during the time period from 24.8 to 25.0 microseconds in the voltage multiplier of the present invention of the first stage, the eighth stage, and the fourteenth stage.

FIGS. 5 to 8 show the simulated voltage waveforms at the first stage 100 (with 1 shown as referring to the node N101, and 100 as referring to the gate of transistor 1M1), and the 14th stage 1400 (with 14 shown as referring to the node N1401, and 1400 as referring to the gate of transistor 14M1). FIGS. 7 and 8 also show the voltage waveforms at the eighth stage 800 (with 8 shown as referring to the node N801, and 800 as referring to the gate of transistor 8M1). FIG. 5 shows the waveforms during the first 500 nanosecond. The voltages at the 14th stage 1400 are quite small during this time as expected. The pumping actions at the first stage 100 shows the voltage at 100, i.e. gate of transistor 1M1, is kept at more than 0.8 volt above 1 throughout the on-cycle. This overdrive in gate voltage increases the pumping efficiency of the pump. FIG. 6 continues to show the period between 1.3 and 1.5 microseconds. A substantial overdrive is shown to be developed at 1400 over 14. FIG. 7 shows the period between 10 and 10.5 microseconds, the overdrive between 1400 and 14 are reduced because the pumped voltage are saturating and no current load is drained from the pump. FIG. 8 further shows the period between 24.8 and 25 microsecond. The output voltage is even more saturated at this time. The overdrives are further reduced in each stage. If a load is applied to the output of the pump, a higher overdrive voltage will be developed to supply the output current.

What is claimed is:

1. A voltage multiplier comprising:
   a plurality of electrically connected like stages including at least a first stage and a second stage;
   each of said first and second stages for receiving a first input signal, a second input signal, and a pump signal, and comprises:
   a first transistor having a first terminal, a third terminal, a channel therebetween, and a second terminal for controlling the flow of current between the first terminal and the third terminal;
   means for receiving said pump signal and for separately pumping said first terminal and said second terminal of said first transistor by said pump signal;
   said first input signal supplied to said first terminal and said second input signal supplied to said second terminal of said first transistor;
   a first output signal supplied from said third terminal of said first transistor;
   a second output signal supplied from said first terminal of said first transistor;
   wherein a voltage signal is supplied to said first stage as the first and second input signals of said first stage and a clock signal having a first phase is supplied to said first stage as the pump signal of said first stage, and
   wherein said first and second output signals of said first stage are supplied to said second stage as the first and second input signals of said second stage and a clock signal having a second phase, different from said first phase is supplied to said second stage as the pump signal of said second stage.

2. The voltage multiplier of claim 1 wherein said second phase is substantially 180° from said first phase.

3. The voltage multiplier of claim 2 wherein said clock signal having a first phase is supplied as the pump signal to a plurality of alternating stages and wherein said clock signal having a second phase is supplied as the pump signal to a plurality of stages other than said alternating stages.

4. The voltage multiplier of claim 3 wherein said means for receiving and for separately pumping of each stage further comprises:
   a first capacitor means having a first terminal and a second terminal with said first terminal of said first capacitor means for receiving said pump signal;
   a voltage regulating means, having a first terminal and a second terminal; said first terminal connected to said first terminal of said first transistor, and said second terminal connected to said second terminal of said first transistor;
   a second transistor having a first terminal, a third terminal, a channel therebetween, and a second terminal for controlling the flow of current between the first terminal and the third terminal, and for providing said second output signal from said first terminal of said first transistor;
   said first terminal of said second transistor connected to said first terminal of said first transistor;
   said second terminal of said first capacitor means connected to said second terminal of said second transistor, and said second terminal of said first transistor; and
   wherein said third terminal of said second transistor supplies said second output voltage.

5. The voltage multiplier of claim 4 further comprising:
   a second capacitor means having a first terminal and a second terminal with said first terminal of said second capacitor means connected to said first terminal of said first capacitor means, and said second terminal of said second capacitor means connected to said first terminal of said first transistor.

6. The voltage multiplier of claim 5 wherein said first capacitor means is an MOS transistor having a first terminal, a third terminal, a channel therebetween, and a second terminal insulated from said channel, with said first terminal electrically connected to said third terminal.

7. The voltage multiplier of claim 6 wherein said second capacitor means is an MOS transistor having a first terminal, a third terminal, a channel therebetween, and a second terminal insulated from said channel, with said first terminal electrically connected to said third terminal.

8. The voltage multiplier of claim 4 wherein said voltage regulating means is a diode means.

9. The voltage multiplier of claim 8 wherein said diode means is a third MOS transistor having a first terminal, a third terminal, a channel therebetween, and a second terminal for controlling the flow of current between the first terminal and the third terminal, and wherein said second terminal is connected to the third terminal and to the second terminal of said first transistor, and said first terminal is connected to the first terminal of said first transistor.

10. The voltage multiplier of claim 1 further comprising:
    a first diode means connecting said voltage signal to said first input signal; and
    a second diode means connecting said voltage signal to said second input signal.

11. The voltage multiplier of claim 10 wherein each of said first and second diode means is an MOS transistor having a first terminal, a third terminal, a channel therebetween, and a second terminal for controlling the flow of current between the first terminal and the third terminal, with said second terminal connected to said third terminal, and to the voltage signal.

12. A voltage multiplier circuit comprising,
    a plurality of electrically connected like stages, each stage comprising:
    a first input node;
    a second input node;
    a first output node;
    a second output node;
    a pump node;
    a first MOS transistor having a first terminal, a second terminal and a channel therebetween, a third terminal for controlling the flow of current between said first and second terminals; said first terminal connected to said first input node; said second terminal connected to said third terminal and to said second input node;
    a second MOS transistor having a first terminal, a second terminal, and a channel therebetween, a third terminal for controlling the flow of current between said first and second terminals; said first terminal connected to said first input node, said second terminal connected to said first output node and said third terminal connected to said second input node;
    a third MOS transistor having a first terminal, a second terminal, and a channel therebetween, a third terminal for controlling the flow of current between said first and second terminals; said first terminal connected to said first input node, said second terminal connected to said second output node and said third terminal connected to said second input node;
    a first capacitor having a first terminal and a second terminal; said first terminal connected to said pump node; said second terminal connected to said second input node;
    wherein said first output node of a first stage is electrically connected to the first input node of a second stage; and said second output node of a first stage is electrically connected to the second input node of said second stage.

13. The circuit of claim 12 further comprising
    a second capacitor having a first terminal and a second terminal; said first terminal connected to said pump node;
    said second terminal connected to said first input node.

14. The circuit of claim 13 wherein each of said first, second and third, MOS transistor is a N type MOS transistor.

15. The circuit of claim 13 wherein said first capacitor is an MOS transistor having a first terminal, a third terminal, a channel therebetween, and a second terminal insulated from said channel, with said first terminal electrically connected to said third terminal.

* * * * *

UNITED STATES PATENT AND TRADEMARK OFFICE
CERTIFICATE OF CORRECTION

PATENT NO.    : 5,886,887
DATED         : March 23, 1999
INVENTOR(S)   : Ching-Shi Jenq It is certified that error appears in the above-identified patent and that said Letters Patent is hereby corrected as shown below:

<u>Title page,</u>
Item [60], please amend to read -- Provisional application No. 60/041,625 Mar. 27, 1997. --.

Signed and Sealed this

Fourth Day of March, 2003

JAMES E. ROGAN
*Director of the United States Patent and Trademark Office*